July 29, 1969     W. SCHOLZ     3,458,209
CHUCK OPERATING DEVICE

Filed June 9, 1966     3 Sheets-Sheet 1

Inventor:
Walter Scholz

By Michael S. Striker
his Attorney

United States Patent Office 3,458,209
Patented July 29, 1969

3,458,209
CHUCK OPERATING DEVICE
Walter Scholz, Neu-Isenburg, Germany, assignor to Werkzeugmaschinenfabrik Gildemeister & Comp., Akt. Ges., Bielefeld, Germany
Filed June 9, 1966, Ser. No. 556,513
Claims priority, application Germany, June 30, 1965, W 39,443
Int. Cl. B23b 31/02, 5/22, 5/34
U.S. Cl. 279—1                                15 Claims

ABSTRACT OF THE DISCLOSURE

In combination with a machine tool which includes a rotatable chuck with movable jaws and a rotary driven element for actuating the jaws, a rotary input member movable back and forth substantially radially of said chuck to engage at the end of its forward stroke the rotary element to actuate the jaws and a friction drive driven by the input member to index the chuck to a position in which the input member is in registry with the rotary element before the input member finishes its forward stroke.

---

The present invention relates to machine tools in general, and more particularly to an improved device which can operate the chuck of a spindle which forms part of a milling, boring or like machine tool.

It is already known to provide a machine tool with an automatic indexing mechanism which places a spindle into requisite angular position so that the mechanism which advances or retracts the jaws of the chuck may be engaged and operated in order to release a finished workpiece or to clamp a fresh workpiece in optimum position for treatment by one or more tools. However, many machine tools are not suited for use with automatic indexing mechanisms because such mechanisms are too complicated, too expensive or cannot be utilized in connection with certain types of work. On the other hand, manual rotation of a spindle to requisite angular position and manual operation of the tool which moves the jaws of the chuck consume much time and effort.

Accordingly, it is an important object of the present invention to provide a machine tool wherein a rotary spindle carries a chuck having one or more movable jaws with a very simple, compact, rugged and versatile operating device which not only indexes the chuck to requisite angular position but can also operate the jaw actuating mechanism to engage a fresh workpiece or to release a finished workpiece.

Another object of the invention is to provide a chuck operating device of the just outlined characteristics which can be manipulated by hand or by a prime mover and which can be moved into gradual rotary motion transmitting engagement with the chuck and/or with the jaw actuating mechanism of the chuck.

A further object of the invention is to provide a chuck operating device wherein a single rotary input member suffices to effect indexing movements of the chuck as well as to transmit motion to the jaw actuating mechanism of the chuck.

A concomitant object of the invention is to provide a chuck operating device which embodies a novel indexing mechanism for the chuck as well as a locating unit which can automatically maintain the chuck in an angular position in which the respective part or parts of the chuck operating device can properly engage the jaw actuating mechanism.

An additional object of the invention is to provide a chuck operating device which can be readily installed in an existing machine tool and which can properly locate the chuck for operation of the jaw actuating mechanism without resorting to complicated programming and like systems.

Briefly stated, one feature of my present invention resides in the provision of a machine tool which comprises a headstock or another suitable support, an indexible chuck rotatably carried by the support (normally through the intermediary of a spindle) and comprising movable jaw means adapted to be advanced or retracted in a manner well known from the art of conventional chucks as well as actuating means for moving the jaw means, such actuating means including at least one rotary driven element which may be constituted by one component of a claw clutch and can transmit motion to a scroll plate or the like which in turn transmits motion to the jaw means, a rotary input member movable back and forth substantially radially of the chuck, a first power train which receives motion from the input member and can rotate the driven element of the jaw actuating means when the input member completes a forward stroke toward the chuck (for example, the first power train may include the other component of a claw clutch and engages with the one component when the input member is moved sufficiently close to the chuck), and a second power train which also receives motion from the input member and is arranged to index the chuck before the input member completes its forward stroke to thereby place the driven element of the jaw actuating means into registry with the first power train. The second power train may comprise a friction wheel transmission or a gear transmission one rotary member of which is affixed to the chuck and another rotary member of which is driven by the input member. In other words, the first power train may include a portion of a clutch and the other power train may be constituted by a transmission which can change the angular position of the chuck while the input member performs its forward stroke toward the chuck. This input member will be caused to perform a return stroke before the chuck is set in rotary motion by its spindle so that the first power train cannot interfere with rotation of the chuck and that all such components of the second power train which are not mounted on or directly associated with the chuck are also held at a safe distance from the chuck.

The improved chuck operating device which includes the input member and the two power trains preferably further includes means for automatically locating the chuck in an angular position in which the first power train can engage a driven element of the jaw actuating means.

The novel features which are considered as characteristic of the invention are set forth in particular in the appended claims. The improved chuck operating device itself, however, both as to its construction and its mode of operation, together with additional features and advantages thereof, will be best understood upon perusal of the following detailed description of certain specific embodiments with reference to the accompanying drawings, in which:

Figure 1:
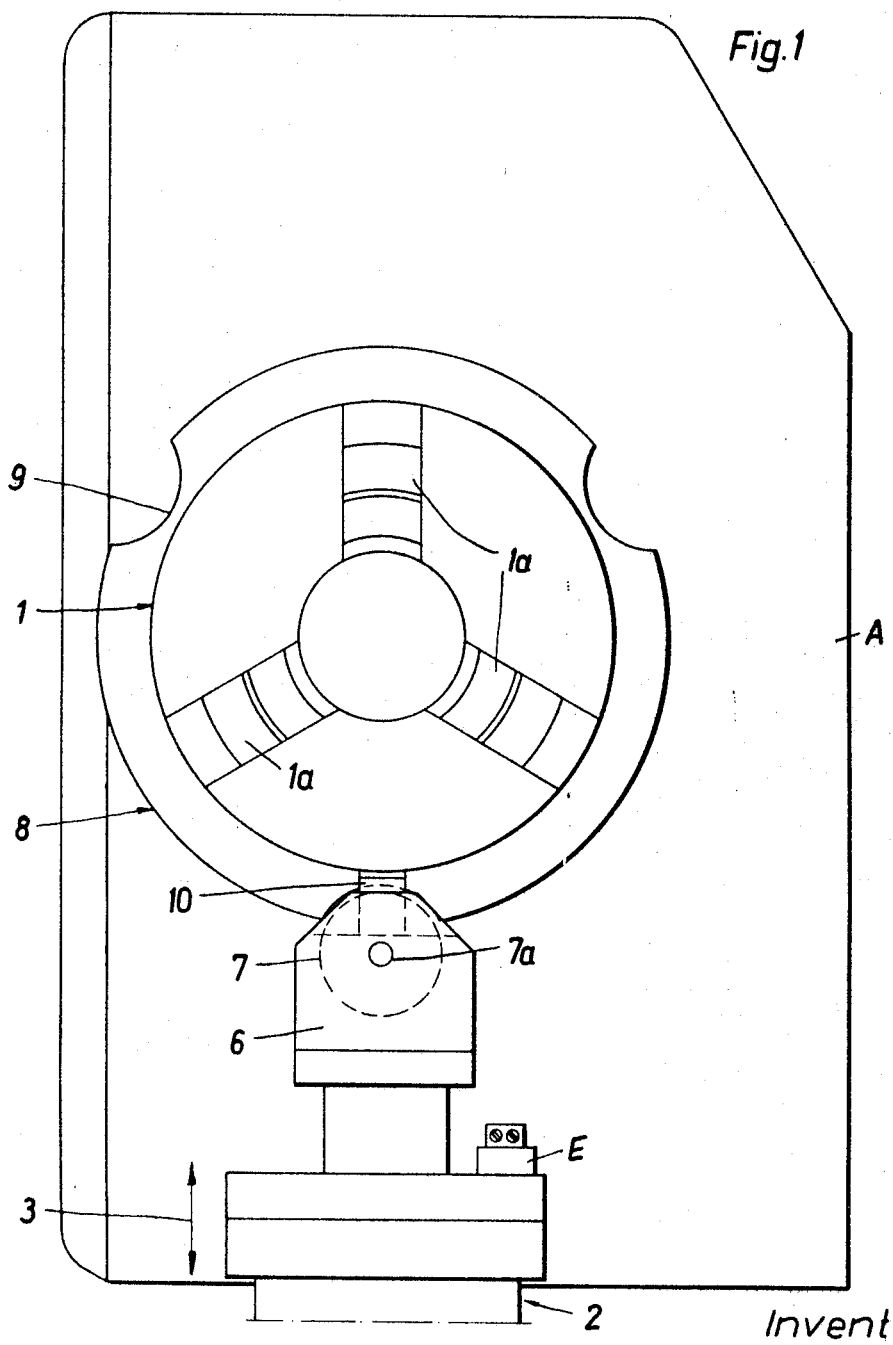
FIG. 1 is a front elevational view of a chuck and of the operating device which embodies one form of my invention.
Figure 2:
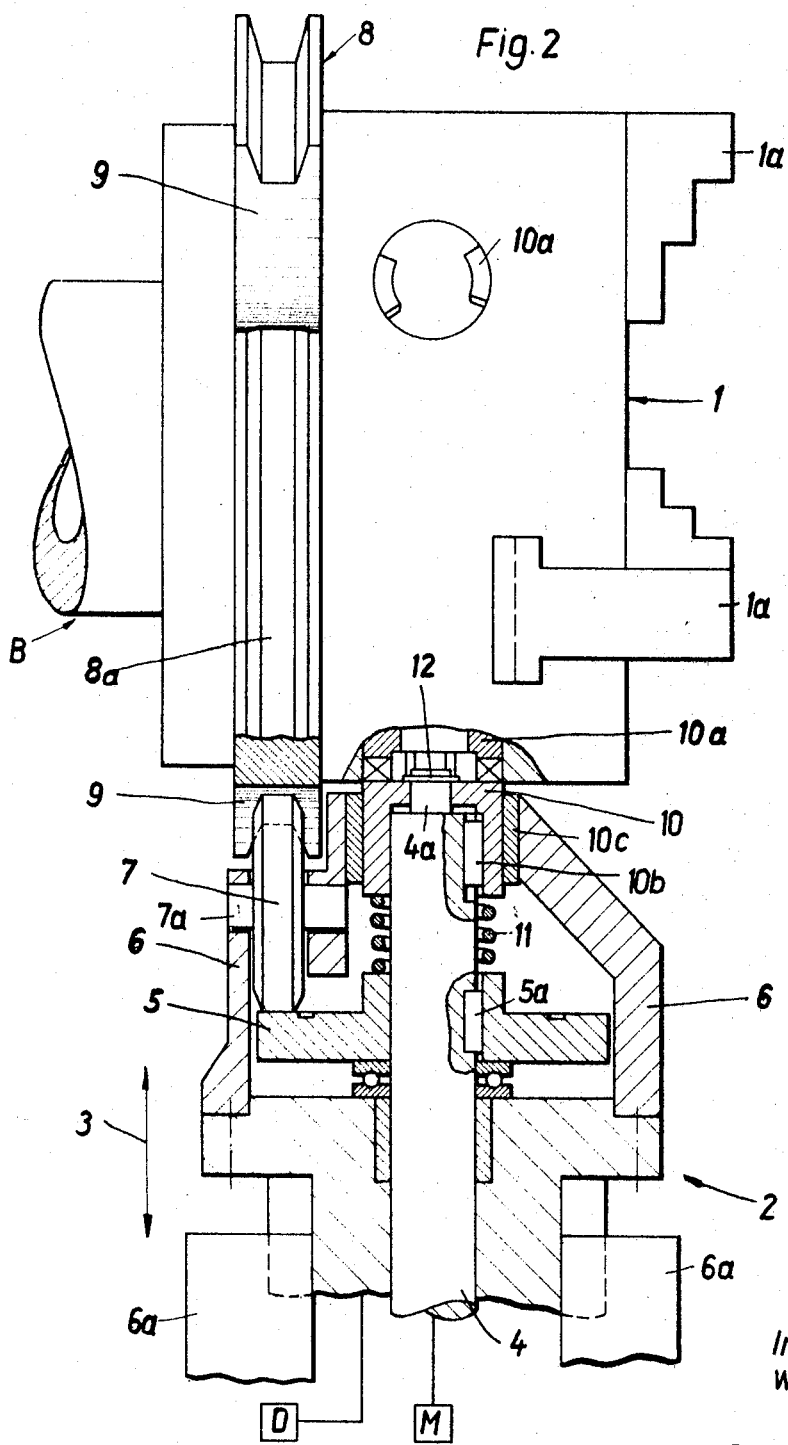
FIG. 2 is a side elevational view of the chuck with the operating device shown in central vertical section.

Referring to the drawings in detail, and first to FIGS. 1 and 2, there is shown a machine tool which comprises a support A, here shown as a headstock, for a horizontal work spindle B whose end portion carries a three-jaw universal chuck 1. The self-centering jaws of this chuck are shown at 1a. In accordance with my present invention, the machine tool further comprises a novel chuck operating device 2 which performs two important functions, namely, it can select the angular position of the chuck 1 when the latter is not driven by the spindle B, and it can also advance or retract the jaws 1a by turning a customary scroll plate or a like element of the actuating mechanism for the jaws 1a. The arrangement is such that the device 2 first indexes the chuck 1 to an angular position in which one of several equi-distant rotary driven elements 10a of the actuating mechanism is placed into requisite position with reference to a rotary input member 4 of the device 2 and that the latter thereupon rotates the selected driven element 10a in order to either advance or retract the jaws 1a, depending upon whether a workpiece is to be clamped or released by the chuck 1. When the spindle B is coupled to and is rotated by its own drive, the chuck operating device 2 is inactive and all such parts of this device which could interfere with rotation of the chuck 1 are retracted sufficiently to allow for unimpeded rotation of the spindle.

In the embodiment of FIGS. 1 and 2, the input member 4 is constituted by a vertical shaft which extends radially of the chuck 1 and is rotatable either by hand (e.g., through a suitable handwheel or crank handle) or by means of a motor M shown in the lower part of FIG. 2. The input member 4 is rotatable in a housing 6 which is movable up and down (see the double-headed arrow 3) along fixed ways 6a provided in the frame of the machine tool. The housing 6 may be reciprocated manually or by means of a motor, for example, through the intermediary of a rack and pinion drive D or the like.

In accordance with an important feature of my invention, the chuck operating device 2 comprises two power trains or motion transmitting units one of which serves to index the chuck 1 and the other of which serves to operate the aforementioned jaw actuating mechanism. In the embodiment of FIGS. 1 and 2, the power train which indexes the chuck 1 comprises a transmission including three friction wheels 5, 7, 8, the latter being mounted on the spindle B or directly on the chuck 1 and being rotatable therewith. The friction wheel 5 is attached to the input member 4 by means of a key 5a so that it shares all angular movements of this input member as well as all movements of the housing 6 toward or away from the chuck 1. The intermediate friction wheel 7 is mounted on a shaft 7a which is journalled in the housing 6 and extends radially of the input member 4. As clearly shown in FIG. 2, the peripheral surface of the friction wheel 7 rolls along the upper end face of the friction wheel 5. The friction wheel 8 is formed with a circumferential groove 8a which can receive a portion of the friction wheel 7.

The other power train comprises a sleeve-like clutch component 10 which is mounted on the upper end portion of the input member 4 and is secured thereto by a key 10b so that it can move axially of but must rotate with the input member. The latter comprises a stub 4a having at its upper end a disk-shaped abutment 12 which limits the upward movement of the clutch component 10. The other power train further comprises a resilient element here shown as a helical clutch spring 11 which operates between a hub of the friction wheel 5 and the clutch component 10 to urge the latter against the abutment 12. The top face of the clutch component 10 is provided with two arcuate claws which can engage similar claws of the registering driven element 10a. The latter constitutes the complementary component of the claw clutch which may rotate the aforementioned scroll plate to thereby move the jaws 1a toward or away from each other, depending on the direction in which the input member 4 rotates.

When the operator wishes to index one of the driven elements 10a into registry with the clutch component 10, he starts the motor M to rotate the input member 4 in a desired direction and then operates the drive D to cause the input member 4 and housing 6 to perform a forward stroke, namely, upwardly toward the chuck 1. The friction wheel 5 rotates with the input member 4 and drives the intermediate friction wheel 7. The latter comes into frictional engagement with the friction wheel 8 and begins to rotate the spindle B together with the chuck 1. Of course, the spindle B is disconnected from its own drive before the housing 6 of the operating device 2 starts to move upwardly. This operating device is further provided with very simple locating means for automatically terminating rotation of the chuck 1 when the chuck assumes a desired angular position in which the clutch component 10 registers with one of the three clutch components or driven elements 10a. The locating means is constituted by three equidistant concave recesses 9 provided in the periphery of the friction wheel 8 and being deeper than the groove 8a. When the friction wheel 7 enters one of the recesses 9, it is automatically disengaged from the friction wheel 8 so that the spindle B comes to a halt. As shown in FIG. 1, the headstock A carries a stationary stop E which arrests the housing 6 when the latter completes its forward stroke. The stop E is positioned in such a way that it arrests the housing 6 at a level when the top portion of the friction wheel 7 extends into the adjoining recess 9 with at least some clearance so that the wheel 7 can rotate without transmitting motion to the wheel 8 and spindle B.

The claws of the clutch component 10 engage the claws of the registering clutch component 10a while the friction wheel 7 penetrates into the respective recess 9. If the claws are not immediately in requisite angular positions for mutual engagement and for transmission of motion to the jaws 1a, the spring 11 yields until the input member 4 changes its angular position and allows for satisfactory engagement between the claws.

The motor M (or the hand-actuated element which transmits rotary motion to the input member 4) is reversible so that the driven element 10a which engages with the clutch component 10 can be rotated in a clockwise or in a counterclockwise direction in order to move the jaws 1a toward each other or apart. It is clear that the chuck 1 may comprise only two, four or more jaws and that the jaws need not be of the self-centering type. The clutch component 10 of the power train which operates the jaw actuating mechanism is rotatable in a bearing sleeve 10c of the housing 6 and is movable axially toward and away from the abutment 12.

In the embodiment of FIGS. 1 and 2, the chuck 1 comprises three equidistant driven elements 10a; however, it is equally possible to provide a single driven element and a single recess 9. The power train which indexes the chuck 1 is then effective until the friction wheel 7 enters the single recess 9 whose angular position is invariably selected in such a way that it can receive the friction wheel 7 only when the corresponding driven element 10a registers with the clutch component 10. As stated before, the clutch component 10 will engage the registering driven element 10a when the friction wheel 7 moves inwardly of the groove 8a and enters the corresponding recess 9.

Figure 3:
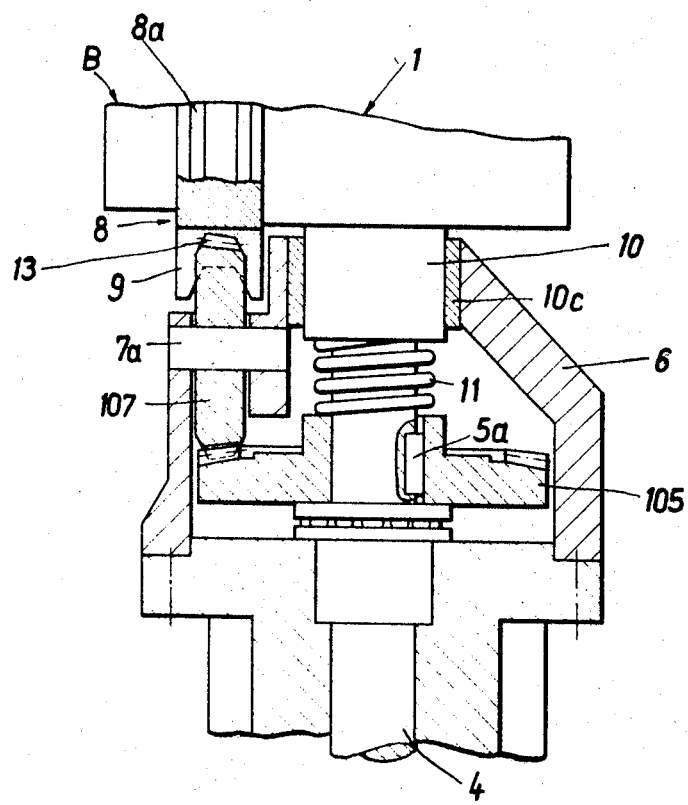
FIG. 3 is a fragmentary central vertical section through a modified operating device.

In many presently known machine tools, the spindle B can be readily rotated in response to torque transmitted by a power train which includes a transmission composed of friction wheels such as the wheels 5, 7 and 8 shown in FIGS. 1 and 2. However, and if the torque transmitted by a set of friction wheels does not suffice to turn the spindle and the associated chuck, or if the transmission of satisfactory torque would result in excessive wear upon the parts, one can resort to a power train of the type shown in FIG. 3. All such parts which are clearly identical to the corresponding parts shown in FIGS. 1 and 2 are denoted by similar reference numerals. The friction wheel 5 is replaced by a bevel gear 105 having an annulus of teeth which mesh with an annulus of gear teeth 13 provided on the periphery of an intermediate friction wheel 107. The peripheral portion of the wheel 107 tapers radially outwardly and can extend with reasonably strong friction into the circumferential groove 8a of the friction wheel 8. It was found that the power train of FIG. 3 is invariably strong enough to index the spindle B so that the clutch component 10 registers with one of the driven elements in the chuck 1. The tapering peripheral portion of the friction wheel 107 wedges itself into the groove 8a with such force that the wheel 8 is set in rotary motion in response to relatively small pressure between the wheels 107 and 8.

My improved chuck operating device takes advantage of the fact that a spindle B which is disconnected from its drive can be rotated by exertion of a relatively small force. Therefore, the power train which indexes the spindle B and the chuck 1 to a selected angular position need not transmit very high torque and such torque may be generated by a relatively small motor or by hand.

A very important advantage of my chuck operating device is seen to reside in that the spindle B is automatically located in requisite angular position for proper engagement between the jaw actuating mechanism and the corresponding power train without necessitating the provision of costly, complicated and sensitive automatic limit switches, valves and similar auxiliaries. This is achieved by the simple expedient of providing the friction wheel 8 with one or more recesses 9 and by providing the stop E which automatically arrests the housing 6 when the input member 4 completes its forward stroke. Also, the engagement between the jaw actuating mechanism and the corresponding power train takes place in automatic response to completion of the indexing operation so that the jaws 1a may be advanced or retracted without delay, namely, as soon as one of the driven elements 10a moves into registry with the clutch component 10. However, it is to be understood that the improved chuck operating device may be provided with other types of locating means for the spindle, for example, with suitable fixed or adjustable stops which terminate the indexing movement as soon as the component 10 registers with one of the driven elements 10a. If, by chance, the friction wheel 7 or 107 automatically enters one of the recesses 9 when the housing 6 is caused to move upwardly, no indexing will take place because such indexing is not needed. This will be readily understood since the friction wheel 7 or 107 will enter a recess 9 only if the clutch component 10 registers with one of the driven elements 10a.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a machine tool, a support; an indexible chuck rotatably carried by said support and comprising movable jaw means and actuating means for moving said jaw means, said actuating means including at lest one rotary driven element; a first friction wheel coaxially fixed to said chuck and having a friction surface provided with at least one recess; a rotary input member movable back and forth substantially radially of said chuck; a first power train receiving motion from said input member and arranged to rotate said driven element when said input member completes a forward stroke toward said chuck; a second power train comprising a second friction wheel driven by said input member and engaging said friction surface while said input member performs its forward stroke whereby said first friction wheel rotates said chuck until said second friction wheel enters said recess to locate thereby said chuck in an angular position in which said driven element registers with said first power train, and said second friction wheel remaining in said recess during completion of the forward stroke of said input member.

2. A structure as set forth in claim 1, further comprising stop means for arresting said input member on completion of said forward stroke, said recess being deep enough to accommodate said second friction wheel with at least some clearance so that said friction wheels are disengaged from each other on completion of said forward stroke and said driven element remains in registry with said first power train.

3. A structure as set forth in claim 2, wherein said driven element constitutes the first of two cooperating components of a claw clutch and said first power train comprises the second component of said claw clutch.

4. A structure as set forth in claim 3, wherein said claw clutch further comprises resilient means for biasing one of said components axially of said input member and toward the other component to allow for smooth engagement between such components while said input member completes its forward stroke.

5. A structure as set forth in claim 4, wherein said input member comprises an abutment disposed between the second component of said claw clutch and said chuck and said resilient means is arranged to bias said second component against said abutment.

6. A structure as set forth in claim 3, further comprising a housing for said input member, said second friction wheel being supported in said housing for rotation about an axis extending substantially radially of said input member and said second power train further comprising a third friction wheel mounted on said input member and frictionally engaging said second friction wheel.

7. A structure as set forth in claim 6, wherein the second component of said claw clutch is carried by and rotates with said input member, said second component being journalled in said housing.

8. A structure as set forth in claim 1, wherein said second friction wheel has an annulus of gear teeth and said second power train further comprises a gear mounted on said input member and having teeth meshing with said annulus of gear teeth to drive said second friction wheel in response to rotation of said input member.

9. A structure as set forth in claim 1, wherein said actuating means comprises a plurality of angularly spaced driven elements and said second power train is arranged to place a selected driven element into registry with said first power train.

10. In a machine tool, a support; an indexible chuck carried by said support and comprising movable jaw means and actuating means for moving said jaw means, said actuating means including at least one rotary driven member; a rotary input member movable back and forth substantially radially of said chuck; a housing rotatably supporting said input member and movable therewith toward and away from said chuck; ways for guiding said housing during such movement relative to said chuck; means for moving said housing; means for rotating said input member in a clockwise and in a counterclockwise direction; a first power train receiving motion from said input member and arranged to rotate said driven element when said input member completes a forward stroke toward said chuck; and a second power train also receiving motion from said input member and arranged to index said chuck before said input member completes its forward stroke to thereby place said driven element into registry with said power train.

11. A structure as set forth in claim 10, wherein said second power train comprises a transmission comprising a first rotary member fixed to and rotatable with said chuck and a second rotary member movable into and away from motion transmitting engagement with said first rotary member in response to movement of said input member toward and away from said chuck.

12. A structure as set forth in claim 11, further comprising means for automatically terminating the motion transmitting engagement between said first and second rotary members in response to placing of said driven element into registry with said first power train.

13. A structure as set forth in claim 12, further comprising rotary spindle means coaxially fixed to said chuck and journalled in said support, said jaw means comprising a plurality of self-centering jaws.

14. In a machine tool, a support; an indexible chuck rotatably carried by said support and comprising movable jaw means and actuating means for moving said jaw means, said actuating means including at least one rotary driven element constituted by a first component of a claw clutch; a rotary input member movable back and forth substantially radially of said chuck; a first power train receiving motion from said input member and comprising a second component of a claw clutch mounted on said input member for rotation therewith and movable in axial direction thereof and engaging said first component in automatic response to completion of said forward stroke of said input member; a second power train comprising a transmission including a first rotary member fixed to and rotatable with said chuck and a second rotary member driven by said input member and movable into and away from motion transmitting engagement with said first rotary member in response to movement of said input member toward and away from said chuck to index said chuck before said input member completes its forward stroke to thereby place said components of said claw clutch into registry with each other; and means for automatically terminating the motion transmitting engagement between said first and second rotary members in response to placing said components in registry with each other.

15. A structure as set forth in claim 10, wherein said chuck is rotatable about a horizontal axis and said input member is rotatable about a vertical axis and moves upwardly while performing said forward stroke.

References Cited

UNITED STATES PATENTS 1,874,888   8/1932   Burrell.

ROBERT C. RIORDON, Primary Examiner

D. R. MELTON, Assistant Examiner

U.S. Cl. X.R.

51—237; 77—64